Collins & Piper,
Pump Cylinder,
N° 34,105. Patented Jan. 7, 1862.

Witnesses:
J. W. Coombs
M. M. Livingston

Inventors,
George Collins
Enoch Piper
per Munn & Co.
Attorneys

UNITED STATES PATENT OFFICE.

GEORGE COLLINS AND ENOCH PIPER, OF CAMDEN, MAINE.

IMPROVEMENT IN PUMPS.

Specification forming part of Letters Patent No. 34,105, dated January 7, 1862.

*To all whom it may concern:*

Be it known that we, GEORGE COLLINS and ENOCH PIPER, both of Camden, in the county of Knox and State of Maine, have invented certain new and useful Improvements in Pumps; and we do hereby declare that the following is a full, clear, and exact description of the same, reference being had to the accompanying drawings, making a part of this specification, in which—

Figure 1:
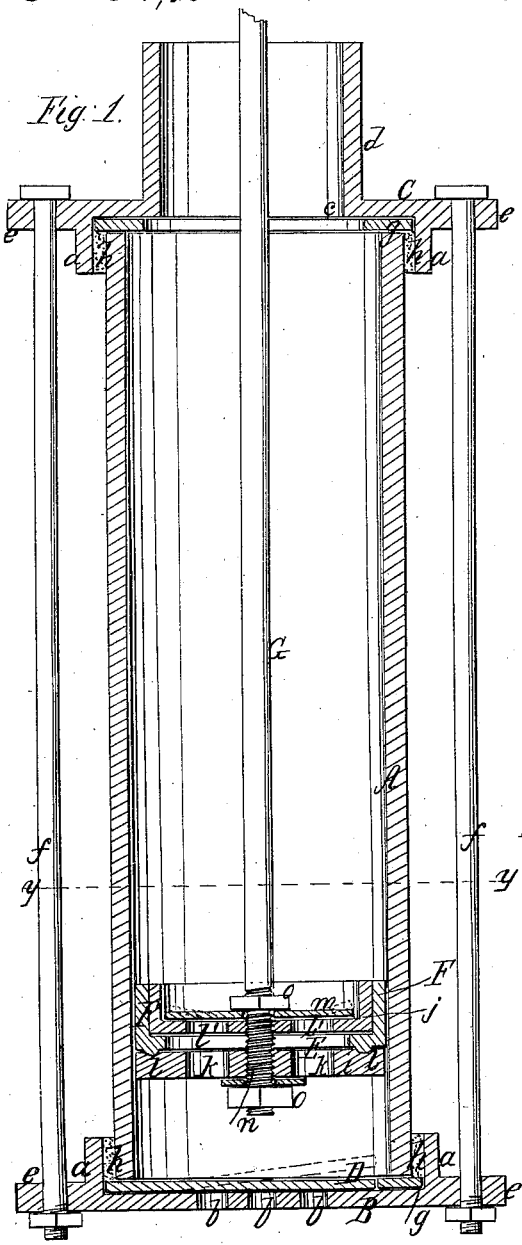
Figure 2:
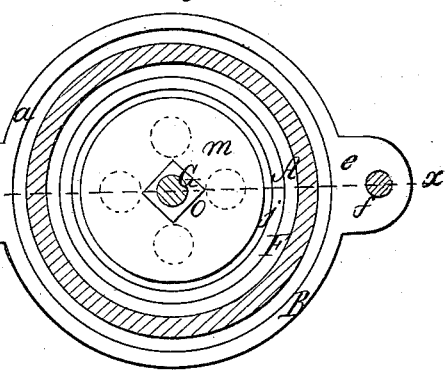

Figure 1 is a longitudinal central section of our invention; Fig. 2, a transverse section of the same, taken in the line $x\ x$, Fig. 1.

Similar letters of reference indicate corresponding parts in the two figures.

This invention relates to certain improvements in reciprocating pumps; and it consists in having the pump-cylinder constructed of glass or a vitreous substance and fitted in a peculiar way between metal heads, as hereinafter fully shown and described, and the piston of the pump constructed in a peculiar manner, whereby the packing may be readily applied to it as well as the valve, and a very simple and durable pump obtained.

To enable those skilled in the art to fully understand and construct our invention, we will proceed to describe it.

A represents the pump-cylinder, which is constructed of glass and of any proper dimensions, and B C represent two metal heads, between which the ends of the glass cylinder are fitted. The heads B C may be of circular form, and each is provided with an annular flange $a$ at its face side, the circular spaces between the flanges being rather greater in diameter than the glass cylinder A. The head B of the glass cylinder is perforated with holes $b$, which serve as induction-passages, and the head C has a circular eduction-opening $c$ in it encompassed by a flange $d$, as shown clearly in Fig. 1.

Each head B C is provided with two ears or lugs $e\ e$ at opposite points, and through these ears or lugs screw-rods $f\ f$ pass, which keep the heads securely on the ends of the cylinder.

At the bottom of each recess formed by the flanges $a\ a$ of the heads there is placed a leather packing $g$. The packing $g$ of the head C is of annular form, and does not project beyond the edge of the eduction-opening $c$; but the packing $g$ of the head B is formed of the same piece of leather as a valve D, which covers the induction-holes $b$ in head B. The ends of the glass cylinder A bear against the packing $g$, and the spaces between the cylinder and the flanges $a\ a$ are filled with plaster-of-paris $h$ or any suitable cement.

By connecting the heads B C to the glass cylinder A in this manner they will all be firmly connected together and the cylinder will be prevented from being fractured or broken by sudden jars or concussions, as the leather packing $g$ has a tendency to prevent the same, being in a certain degree yielding or elastic, and at the same time forming a perfectly water-tight joint, and also compensating for the expansion and contraction of the heads B C and the cylinder, so that the latter will not be fractured thereby. The plaster-of-paris $h$ is unyielding; but it will be understood that the cylinder A does not expand or contract much laterally, as its diameter is small compared with its length, and hence there would not be any danger of fracture by the lateral expansion of the same.

E represents the piston of the pump, which is formed of two metallic parts $i\ j$. The part $i$ is simply a circular disk perforated with holes $k$ and having an annular recess $l$ in its face or inner side near its edge. The other metallic part $j$ is of cup form, as shown clearly in Fig. 1, and it is perforated at its bottom, as shown at $l'$, said perforations corresponding with the perforations or holes $k$ in the part $i$. Within the part $j$ of the piston there is placed a valve $m$, which is simply a circular piece of leather fitted over the holes $l'$. Between the two metallic parts $i\ j$ of the piston there is fitted or placed an annular packing F. This packing is of sufficient width to extend a certain distance between the two parts $i\ j$, and also extend up around the side of the part $j$, as shown clearly in Fig. 1. The part $j$ is rather less in diameter than the part $i$, and the edge of the part $i$ just clears the inner side of the cylinder A, the packing F only working in contact with the cylinder A. The parts $i\ j$, packing F, and valve $m$ are connected together by the lower end of the piston-rod G, which passes centrally through said parts and has a screw-thread $n$ upon it, on which two nuts $o\ o$ are fitted or placed, one nut being over the valve $m$ and the other at the bottom of the part $j$, as shown clearly in Fig. 1. By this mode of constructing the piston the packing F may be readily replaced when worn, and the valve $m$ may also be readily replaced when necessary. In consequence of having the annular recess $l$ in the part $i$ of the piston the packing F is held firmly in proper position as it is made to sink or fit into the recess under the pressure produced by screwing up the nuts $o\ o$.

Having thus described our invention, what we claim as new, and desire to secure by Letters Patent, is—

A pump having a cylinder A constructed of glass with its ends fitted in metallic heads B C, as shown, in combination with the piston E, formed of two metallic parts $i\ j$, perforated, as shown, and provided with the packing F and valve $m$, and connected together by the screw and nuts, all arranged as set forth.

GEORGE COLLINS.
          ENOCH PIPER.

Witnesses:
  HIRAM BASS,
  NATHANIEL CROOKER.